May 20, 1958     W. FEW     2,835,766

THERMOSTAT

Filed Nov. 15, 1955

*INVENTOR.*
WILLIAM FEW
BY
Maurice A. Weikart
ATTORNEY

United States Patent Office 2,835,766
Patented May 20, 1958

2,835,766

THERMOSTAT

William Few, Goshen, Ind., assignor to Penn Controls Incorporated, Goshen, Ind., a corporation of Indiana Application November 15, 1955, Serial No. 547,007

7 Claims. (Cl. 200—122)

This invention relates generally to heat anticipating thermostats and particularly to a thermostat in which the heat anticipating feature is independent of the current in the control circuit into which the thermostat is connected.

In domestic heating, to provide accurate control of room temperature, it has been customary to utilize an auxiliary or anticipating electric heater, mounted adjacent the thermostat bimetal and connected in series with the thermostat contacts. The utility of this arrangement is illustrated and described in Shafer Patent 1,583,496. As shown in the Shafer patent, the most convenient way to obtain the small amount of heat (of the order of .1 watt) to be applied to the thermostat bimetal is to connect an electric heater in series with the thermostat contacts. Under these conditions the heat output of the anticipating heater is a function of the current flowing in the thermostat circuit.

When thermostats are sold with matching controlled components, gas valves or oil burner primary controls, the control circuit current is known and an anticipating heater may be chosen having the proper resistance to provide the desired amount of heat output. Many thermostats, however, are sold as replacements for older, less accurate units and are, consequently, integrated into control circuits containing controlled components of various manufacturers having differing current requirements. It is obvious that in this situation the proper heater size for a particular installation cannot be determined in advance of the particular installation. In the past this difficulty has been met by providing thermostats in which the anticipating heater is removable so that the proper heater, matching the current in the control circuit into which the thermostat is to be connected, can be inserted at the installation of the heating equipment. In order that the thermostat can be universally used in various installations and as a replacement unit, the interchangeable heater type requires that the dealer stock a large group of heaters, of various electrical resistance, and the installer must have with him at the installation a representative group of these heaters so that he can match the thermostat to the current requirement of the control circuit. The inconvenience in this arrangement is obvious. Other attempts at the solution to this problem have been the use of anticipating heaters energized independently of the control circuit, consequently requiring additional wiring extending from the furnace to the thermostat, and the use of somewhat complicated range shifting apparatus for matching an over-sized heater to the control circuit, as exemplified in Malone Patent 2,687,610.

In the growing air conditioning market, where air conditioning units with dual heating and cooling thermostats are sold as adjuncts to already existing heating systems, the need for an anticipating type thermostat which is universally usable with various heating system control components has greatly increased.

The present invention is directed to such a universal thermostat and utilizes an electrical heater in parallel with the thermostat contacts, and therefore energized only when the contacts are open, to drive the thermostat bimetal into its closed contact position. This is accomplished by use of an auxiliary bimetal which is heated by the anticipating heater, the principal bimetal retaining the conventional characteristic of moving toward open-contact position upon an increase in its ambient temperature. This reversal of the conventional heat anticipating action to permit use of a parallel connected, anticipating heater in a heating plant controlling thermostat is a feature of the present invention and distinguishes it over the parallel connected anticipating heater arrangements which have been used in the past for cooling or refrigeration controls, as exemplified by Buchanan Patent 2,163,744 in which ambient temperature and the heat from the anticipating heater both drive the thermostat bimetal in the same direction.

In the present invention since the anticipating heater is energized only when the control circuit load components, such as a magnetic gas valve or control relay, are de-energized, the current through the anticipating heater is quite small and the heat output of the anticipating heater, as will subsequently be pointed out, is consequently less sensitive to line voltage fluctuations.

A further advantage in the present invention exists because the heat output of the parallel-connected heater tends to correct the operation of the thermostat for load error or droop. This phenomenon is well-known in the art and is a control defect inherent in anticipating thermostats. It occurs in general because the anticipating heater establishes a temperature gradient between the thermostat bimetal and the surrounding air; as the heating load increases so that the auxiliary heater is on longer, this temperature gradient becomes more pronounced, and consequently the thermostat control point is correspondingly lowered. At least partial compensation for this phenomenon can be provided by introducing auxiliary heat, with proper thermal lag, into the thermostat, as described in Fiene Patent 2,295,340. In the present invention, since the heat output of the anticipating heater is introduced when the thermostat contacts are open, the anticipating heater tends to correct the thermostat for droop, after the fashion of the aforementioned Fiene patent.

A primary object of the present invention is to provide an anticipating type thermostat which is universally adaptable to various control circuits without matching the anticipating heater to the control circuit current.

A further object is to provide a thermostat of the anticipating type which is relatively unaffected, in its performance, by line voltage variations.

A further object is to provide a thermostat of the anticipating heater type in which load error or droop is of reduced magnitude.

These and other objects will be made apparent by the detailed description hereafter set out and the drawings in which.

Figure 1:
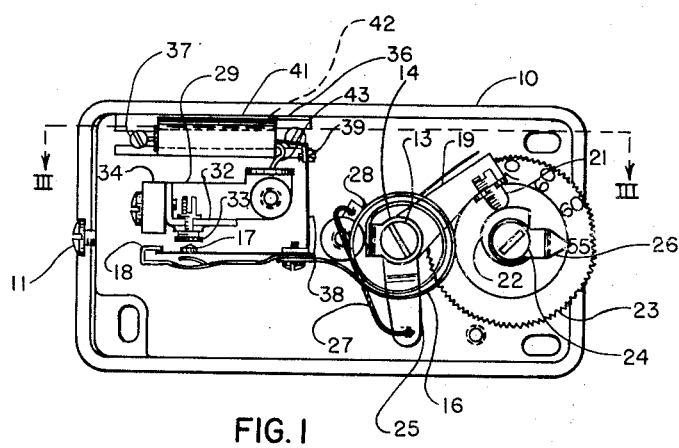
Figure 1 is a top view of a thermostat embodying the invention.
Figure 3:
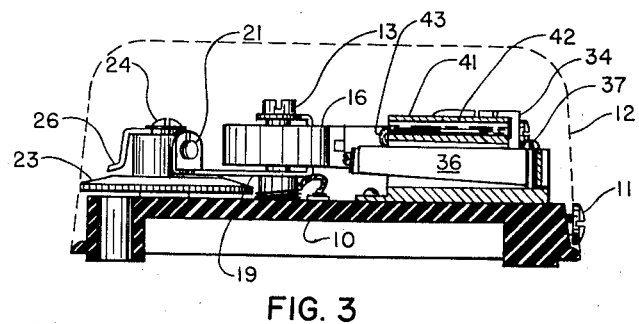
Figure 3 is a sectional view taken generally along the line III—III of Figure 1.
Figure 2:
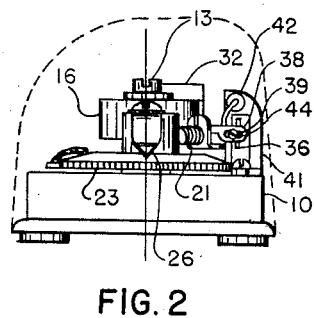
Figure 2 is an end view.

Referring principally to Figures 1, 2, and 3, reference numeral 10 identifies a thermostat base, formed of Bakelite, or other suitable insulating material, and adapted for mounting horizontally, as shown, on the wall of a room or other enclosure. A clamping screw 11 serves to retain a conventional cover member 12 (shown in broken line in Figure 3) over the base.

A central bearing post 13, extending from the base 10 has mounted thereon for pivotal movement a bell-crank member 14, which carries a conventional, spirally shaped bimetal element 16. The free end of element 16 carries a contact assembly of a conventional type which includes a moveable contact 17 and an armature 18. One arm 19 of member 14 carries a calibrating screw 21 adapted to bear against the surface of a helically shaped cam 22 which is formed integrally with a manually operable, temperature adjusting dial 23. Dial 23 is mounted for rotational movement with respect to the base 10 by means of a post 24 which, additionally, holds in fixed relation to the base a temperature adjustment indicating pointer 26.

The other arm 25 of member 14 carries a flexible electrical lead wire 27 which extends to a terminal lug 28.

A metal bracket 29 mounted on the base 10 has an upstanding flange 32 which carries fixed contact 33, adapted to cooperate with the moveable contact 17. A permanent magnet 34 is additionally carried by the flange 32 and is adapted to cooperate with armature 18 to provide snap opening and closing of contacts 17—33. The bimetal element 16 has its component metals arranged so that upon an increase in temperature at element 16, contacts 17 and 33 are moved to open circuit position, and on a decrease in temperature element 16 closes contacts 17 and 13.

As may best be seen in Figure 3, an auxiliary bimetal blade 36 has one end fixedly mounted on the base 10 by means of the screw-headed mounting post 37. The free end of blade 36 is mechanically linked, by means of screw 39 to a linking member 38 which is rigidly fastened to the free end of bimetal element 16. An elongated slot 44 (Figure 2) permits the effective length of member 38 to be adjusted. The free end of blade 36 is adapted to be flexed upwardly, as viewed in Figure 1, when its temperature is increased.

Surrounding the blade 36 is a generally rectangularly shaped heat shielding and heat retaining member 41, having a relatively large mass to surface area ratio, which is held in place by means the post 37. Slightly above the blade 36, as viewed in Figure 3, the member 41 houses an electrical heater 42. Wire 43, extending from one end of heater 42 to bracket 29, and the connecting electrically of the other end of heater 42 to member 41 internally and to blade 36 by means of post 37, serve to electrically connect heater 42 in parallel with the thermostat contacts 17—33, the member 38 serving to connect blade 36 and element 16 both electrically and mechanically as may be seen in Figure 4.

Figure 4:
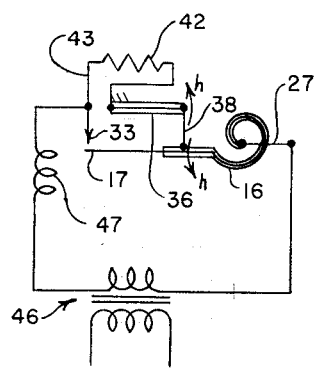
Figure 4 is a schematic representation of the thermostat connected into a typical control circuit.

Referring now to Figure 4, the thermostat is shown connected into a typical control circuit which receives its power from a step-down transformer 46. The load element in the circuit is indicated by the reference numeral 47 and may take the form of a solenoid gas valve, relay coil, or any other regulating component of the heating plant being controlled.

Operation

For a conventional 24 volt control circuit, to produce the required heat output, the heater 42 may have a relatively large resistance, of the order of 3,000 ohms. The load element 47 will have an impedance which may vary generally from 25 to 125 ohms, depending on its type. With the thermostat contacts 17—33 open, as shown in Figure 4, it will be apparent that almost the total circuit voltage drop will appear across the heater 42, and the small voltage appearing across element 47 will be insufficient to energize it. When the thermostat contacts 17—33 are closed, the heater 42 will be shunted and the total circuit voltage will appear across element 47, causing it to move to energized position.

With the thermostat contacts open as shown in Figure 4, heater 42 will be energized and, assuming the temperature of the room in which the thermostat is located is below the thermostat control point, contacts 17—33 will be moved to closed position by blade 36, responding to the heat output of anticipating heater 42. Closure of contacts 17—33 deenergizes the anticipating heater 42 and energizes the load element 47 to place the heating plant in operation. With blade 36 cooling because anticipating heater 42 is deenergized and with the room temperature rising because of the operation of the heating plant, bimetal element 16 will, after a short interval, reopen the contacts 17—33. This shuts down the heating plant and reenergizes anticipating heater 42. If the preceding operating cycle of the heating plant has not brought the room temperature up to the thermostat control point, blade 36 will, after a short interval, reclose the thermostat contacts to initiate another heating plant operation.

The parallel connected anticipating heater arrangement just described permits the use of a relatively high resistance anticipating heater to obtain the required thermal effect on blade 36. The current in the control circuit with contacts 17—33 open is consequently quite small. Since the impedance of load element 47 is so small (depending on the manufacturer and the type, i. e. magnetic valve, relay coil, etc., the load element impedance may vary from 25 to 125 ohms) in comparison with the resistance of the anticipating heater, whether the load impedance happens to be 25 or 125 ohms has no significant effect on the thermal output of the anticipating heater. The thermostat can, therefore, be used in circuits containing load elements of varying types without the necessity of matching the anticipating heater to the particular control circuit. The utilization of the arrangement in which bimetal blade 36 closes the thermostat contacts on an increase in its temperature, while bimetal element 16 moves to open the thermostat contacts upon an increase in room temperature, permits the parallel connected anticipating heater to be used in a heating system thermostat, with the attendant advantages herein described.

Figure 5:
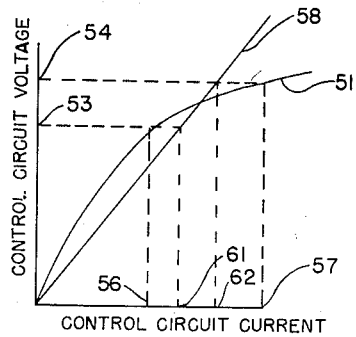
Figure 5 is a curve illustrating the relationship of line voltage and control circuit current.

The diagram of Figure 5 shows at 51 the characteristic voltage-current relation in a control circuit utilizing a conventional series connected anticipating heater. In such an arrangement line voltage change 53—54 will create, because of the saturation characteristic of the load element, a relatively large current change 56—57. Since the thermal output of the anticipating heater is a function of the square of the control circuit current, this current change will be magnified in its effect on the anticipating heater's thermal output. The conventional, series connected anticipating heater thermostat is therefore sensitive to, and adversely affected by, even small voltage changes. At 58 in Figure 5 is shown the voltage-current relation in a control circuit utilizing the thermostat embodying the present invention. Since the anticipating heater is energized only when the load element 47 is deenergized, the saturation characteristic of the load element does not exhibit itself in the voltage-current relationship which consequently is substantially linear. A voltage change 53—54 produces only a relatively small variation 61—62 in control circuit current, and the effect of the voltage change on the thermal output of the heater 42 is thereby minimized.

Because bimetal elements 16 and bimetal blade 36 move in opposed directions upon being heated, the thermal output of anticipating heater 42 must be localized as much as possible so as to affect only blade 36. In the thermostat herein disclosed this isolating of heater 42 is accomplished by the shielding effect of member 41, and by locating heater 42 vertically above bimetal element 16 as may be seen in Figure 1 which shows the thermostat in its normal, wall-mounted position. This arrangement eliminates the transfer of heat by convection from heater 42 to bimetal element 16. The increment of the thermal output of heater 42 which is eventually transferred to other portions of the thermostat by radiation and conduction is, it will be noted, a direct function of the length of the thermostat's off-periods. As is known in the art, droop or load error, which is characteristic of anticipating type thermostats can be compensated for by the application of heat, under proper conditions, to the thermostat during the thermostat's off-periods. The increment of the thermal output of heater 42 which is not localized at blade 36 thus tends to correct the operation of the thermostat of the present invention for load error.

From the foregoing it will be apparent that the present invention provides a universally usable anticipating type thermostat which is substantially unaffected by line voltage fluctuations. Alterations may be made in the disclosure herein presented without departing from the scope of the invention which is to be limited only by the appended claims.

What is claimed is:

1. A thermostat adapted to control the temperature of an enclosure comprising a base, a main thermally responsive element mounted on the base and adapted to move in one direction upon an increase in the temperature of said enclosure, an auxiliary thermally responsive element mechanically linked to said main responsive element and moveable upon an increase in its ambient temperature to oppose movement of said main responsive element in said one direction, electrical contacts operable by said main responsive element and adapted to be separated upon a predetermined movement of said main responsive element in said one direction, an electric heater mounted on said base adjacent said auxiliary responsive element and connected in parellel with said contacts, and shielding means adapted to confine substantially all the thermal output of said heater to said auxiliary responsive member.

2. A thermostat adapted to control the temperature of an enclosure comprising a base, a main thermally responsive element mounted on the base and adapted to move in one direction upon an increase in the the temperature of said enclosure, an auxiliary thermally responsive element, adjustable linkage means mechanically linking said auxiliary responsive element and said main responsive element, said auxiliary responsive element being movable upon an increase in its ambient temperature to oppose movement of said main responsive element in said one direction, electrical contacts operable by said main responsive element and adapted to be separated upon a predetermined movement of said main responsive element in said one direction, an electric heater mounted on said base adjacent said auxiliary responsive element and connected in parellel with said contacts, and shielding means adapted to confine substantially all the thermal output of said heater to said auxiliary responsive member.

3. A thermostat adapted to control the temperature of an enclosure comprising a base, a main thermally responsive element mounted on the base and adapted to move in one direction upon an increase in the temperature of said enclosure, an auxiliary thermally responsive element, adjustable linkage means mechanically linking said auxiliary responsive element and said main responsive element, said auxiliary responsive element being moveable upon an increase in its ambient temperature to oppose movement of said main responsive element in said one direction, electrical contacts operable by said main responsive element and adapted to be separated upon a predetermined movement of said main responsive element in said one direction, an electric heater mounted on said base adjacent said auxiliary responsive element and connected in parallel with said contacts, said heater being mounted so that the convective path of the heat generated by said heater avoids said main thermally responsive member.

4. A thermostat adapted to control the temperature of an enclosure comprising a base, a main thermally responsive element mounted on the base and adapted to move in one direction upon an increase in the temperature of said enclosure, an auxiliary thermally responsive element mechanically linked to said main responsive element and moveable upon an increase in its ambient temperature to oppose movement of said main responsive element in said one direction, a fixed contact mounted on said base, a cooperating moveable contact operated by said main responsive element, said contacts being separated upon a predetermined movement of said main responsive element in said one direction, an electric heater mounted on said base and connected in parallel with said contacts, and a body having a relatively high mass to surface area ratio monuted on said base and adapted to confine substantially all the thermal output of said heater to said auxiliary responsive element.

5. A thermostat adapted to control the temperature of an enclosure comprising a base, a main thermally responsive element mounted on the base and adapted to move in one direction upon an increase in the temperature of said enclosure, an auxiliary thermally responsive element mechanically linked to said main responsive element and moveable upon an increase in its ambient temperature to oppose movement of said main responsive element in said one direction, a fixed contact mounted on said base, a cooperating moveable contact operated by said responsive element, said contacts being separated upon a predetermined movement of said main responsive element in said one direction, an electric heater mounted on said base and connected in parallel with said contacts, and a shielding member having a relatively large mass to surface area ratio substantially enclosing said heater and said auxiliary responsive element for confining the thermal output of said heater to said auxiliary thermal element.

6. A thermostat adapted to control the temperature of an enclosure comprising a base, a main bimetal element mounted on the base and adapted to move in one direction upon an increase in the temperature of said enclosure, an auxiliary bimetal element mechanically linked to said main bimetal element and moveable upon an increase in its ambient temperature to oppose movement of said main bimetal element in said one direction, a fixed contact mounted on said base, a cooperating moveable contact operated by said main bimetal element, said contacts being separated upon a predetermined movement of said main bimetal element in said one direction, an electric heater connected in parallel with said contacts, and a shielding member having a relatively large mass to surface area ratio substantially enclosing said heater and said auxiliary bimetal element for confining the thermal output of said heater to said auxiliary bimetal element.

7. An anticipating thermostat for closing the circuit to loads having relatively widely varying impedance including electrical contacts movable between closed and open positions and connected in said load circuit, dual thermally responsive elements adapted to exert opposing forces upon a temperature change, said contacts being moved between open and closed positions by the resultant of said opposing forces, an electrical anticipating heater connected in parallel with said electrical contacts and thus energized only when said contacts are in open position, the thermal output of said heater being applied to only that one of said thermally responsive members which tends to move said contacts to closed position upon a temperature increase, the resistance of said heater being relatively large compared to the impedance range of said loads, whereby the thermal output of said heater is substantially independent of said load impedance.

References Cited in the file of this patent

UNITED STATES PATENTS

| | | |
|---|---|---|
| 1,672,859 | Phelps | June 5, 1928 |
| 1,695,879 | Clark | Dec. 18, 1928 |
| 2,236,699 | Riche | Apr. 1, 1941 |
| 2,262,343 | Shaw | Nov. 11, 1941 |
| 2,376,092 | Shaw et al. | May 15, 1945 |
| 2,392,498 | Osterheld | Jan. 8, 1946 |
| 2,446,474 | Harrold | Aug. 3, 1948 |
| 2,563,341 | Kettering | Aug. 7, 1951 |

FOREIGN PATENTS

| | | |
|---|---|---|
| 355,228 | Great Britain | Aug. 17, 1931 |
| 60,442 | France | Apr. 21, 1954 |

(Addition to French Patent 996,194)